(12) United States Patent
Chan et al.

(10) Patent No.: US 8,192,680 B2
(45) Date of Patent: Jun. 5, 2012

(54) METHOD FOR FIRING CERAMIC HONEYCOMB BODIES IN A KILN

(75) Inventors: Yuk Fung Chan, Newark, DE (US); Gregory Paul Dillon, Horseheads, NY (US); Tudor Constantin Gheorghiu, Painted Post, NY (US); Mahesh Chandra Mathur, Horseheads, NY (US); Adedoyin Ademola Oyelaran, Corning, NY (US); David Robert Potts, Blacksburg, VA (US)

(73) Assignee: Corning Incorporated, Corning, NY (US)

( * ) Notice: Subject to any disclaimer, the term of this patent is extended or adjusted under 35 U.S.C. 154(b) by 413 days.

(21) Appl. No.: 12/229,830

(22) Filed: Aug. 27, 2008

(65) Prior Publication Data
US 2009/0057963 A1 Mar. 5, 2009

Related U.S. Application Data

(60) Provisional application No. 60/967,229, filed on Aug. 31, 2007.

(51) Int. Cl.
*C04B 33/32* (2006.01)

(52) U.S. Cl. ........................ 264/606; 264/630

(58) Field of Classification Search .................. 264/605, 264/606, 630, 631
See application file for complete search history.

(56) References Cited

U.S. PATENT DOCUMENTS

| | | | | |
|---|---|---|---|---|
| 2,975,499 | A | * | 3/1961 | Lapp .............................. 264/606 |
| 5,316,710 | A | * | 5/1994 | Tasaki et al. .................. 264/630 |
| 6,048,199 | A | | 4/2000 | Dull et al. ...................... 432/128 |
| 6,089,860 | A | | 7/2000 | Dull et al. ........................ 432/72 |
| 6,099,793 | A | | 8/2000 | Dull et al. ..................... 264/631 |
| 6,764,743 | B2 | * | 7/2004 | Kato et al. ..................... 428/118 |
| 2002/0008334 | A1 | * | 1/2002 | Gheorghiu et al. ........... 264/432 |
| 2002/0084555 | A1 | | 7/2002 | Araya et al. ................... 264/430 |

FOREIGN PATENT DOCUMENTS

| | | |
|---|---|---|
| EP | 0 234 887 | 7/1990 |
| EP | 0 709 638 | 5/2000 |
| EP | 0 713 633 | 12/2000 |
| WO | 99/28689 | 6/1999 |

* cited by examiner

*Primary Examiner* — Matthew Daniels
*Assistant Examiner* — Erin Snelting
(74) *Attorney, Agent, or Firm* — Joseph M. Homa; Matthew J. Mason

(57) ABSTRACT

A method for fabricating ceramic honeycomb structural bodies that includes conveying at least one green honeycomb structural body of a first type and at least one green honeycomb structural body of a second type through a kiln in a manner which reduces cracking or fissures in the fired objects.

20 Claims, 1 Drawing Sheet

METHOD FOR FIRING CERAMIC HONEYCOMB BODIES IN A KILN

RELATED APPLICATIONS

This application claims the benefit of U.S. Provisional Application No. 60/967,229, filed Aug. 31, 2007, entitled "Method for Firing Ceramic Honeycomb Bodies in a Kiln."

BACKGROUND

This invention relates to a method for firing green ceramic honeycomb structural bodies in a kiln.

In an attempt to reduce atmospheric pollution, many countries are imposing increasingly stringent limits on the composition of exhaust gases produced by internal combustion engines and released into the atmosphere. One method of reducing or minimizing the quantity of particulate matter present in the exhaust gases emitted into the environment is the placement of a honeycomb body in the exhaust system associated with the engine.

SUMMARY

Disclosed herein is a method for firing ceramic or ceramic-forming greenware honeycomb structures in a manner which reduces fissure density within the final honeycomb structures, for example by providing a tunnel kiln for firing ceramic honeycomb structural bodies and conveying the bodies through the kiln in a manner which reduces thermal gradient between the inner and outer portions of the green honeycomb structural bodies, thereby permitting the production of ceramic honeycomb structural bodies exhibiting less cracks.

In one aspect, a method is disclosed herein of manufacturing honeycomb bodies comprising: placing first and second subsets of honeycomb bodies in a tunnel kiln while conveying through the tunnel kiln, the first and second subsets of honeycomb bodies arranged on a plurality of vehicles comprising a first group of vehicles carrying honeycomb bodies of the first subset and a second group of vehicles carrying honeycomb bodies of the second subset, wherein the honeycomb bodies are exposed to a plurality of heating zones in the kiln, wherein each honeycomb body in the first subset has a honeycomb wall thickness of greater than the honeycomb wall thickness of each honeycomb body in the second subset, wherein fewer than 60% of the honeycomb bodies in the kiln are of the second type. Preferably, fewer than 45% of the vehicles in sequence in the kiln carry at least one honeycomb body of the second type. More preferably, fewer than 30% of the vehicles in sequence in the kiln carry at least one honeycomb body of the second type. In some embodiments, fewer than 15% of the vehicles in sequence in the kiln carry at least one honeycomb body of the second type. In some embodiments, the plurality of vehicles comprises more than seven vehicles, and for every seven of the vehicles arranged in sequence, no more than two vehicles carrying a honeycomb body of the second type are arranged adjacent to each other. In some embodiments, the plurality of vehicles comprises more than seven vehicles, and for every seven of the vehicles arranged in sequence, no more than one vehicle carrying at least one honeycomb body of the second type are arranged adjacent to each other. In some embodiments, the plurality of vehicles comprises more than seven vehicles, and no more than seven of the plurality of vehicles arranged in sequence carry at least one honeycomb body of the second type. In some embodiments, at least one of the plurality of vehicles carries more than one honeycomb body. In some embodiments, each of the plurality of vehicles carries more than one honeycomb body. In some embodiments, the plurality of vehicles comprises more than 30 vehicles. In some embodiments, the tunnel kiln comprises more than 30 heating zones. In some embodiments, the number of vehicles is substantially equal to the number of heating zones. In some embodiments, the number of vehicles is greater than the number of heating zones, while in other embodiments the number of vehicles is less than the number of heating zones. Preferably, water is removed from each honeycomb body as the body is conveyed through the kiln. In some embodiments, an absolute value of a temperature difference between an outer surface and a central region of each honeycomb body does not exceed about 15° C.

In another aspect, a method is disclosed herein of manufacturing honeycomb bodies comprising: placing first and second subsets of honeycomb bodies in a tunnel kiln while conveying the first and second subsets of honeycomb bodies through the tunnel kiln, wherein the honeycomb bodies are exposed to a plurality of heating zones in the kiln, wherein each honeycomb body in the first subset has a honeycomb wall thickness of greater than or equal to 0.10 mm, and wherein each honeycomb body in the second subset has a honeycomb wall thickness of less than or equal to 0.08 mm, wherein the honeycomb bodies are conveyed on vehicles arranged in sequential order inside the kiln, and at least one vehicle carrying a honeycomb body of the second subset is interposed between at least two vehicles carrying only honeycomb bodies of the first subset, wherein fewer than 60% of the honeycomb bodies present in the kiln are from the second subset.

In another aspect, a method is disclosed herein for fabricating ceramic honeycomb structural bodies comprises providing a kiln defining a firing tunnel, providing at least one vehicle adapted to support green honeycomb structural bodies, providing at least one green honeycomb structural body of a first type comprising a plurality of cells defined by a plurality of intersecting walls having a wall thickness of 0.10 mm (4 mils) or greater, and providing at least one green honeycomb structural body of a second type comprising a plurality of cells defined by a plurality of intersecting walls having a wall thickness of 0.08 mm (3 mils) or less. The method also may include placing the at least one green honeycomb structural body of the first type and the at least one green honeycomb structural body of the second type on the at least one vehicle, and transporting the at least one vehicle into the firing tunnel, wherein both the at least one green honeycomb structural body of the first type and the at least one green honeycomb structural body of the second type are disposed in the firing tunnel at the same time. The method also further preferably comprises firing the at least one green structural body of the first type into an at least one ceramic honeycomb structural body of a first type, and firing the at least one green honeycomb structural body of the second type into an at least one ceramic honeycomb structural body of a second type. In some embodiments, the method for fabricating the ceramic honeycomb structural body also comprises the steps of providing a first plurality of green honeycomb structural bodies each having an outer surface, a central region, a first end, a second end and a plurality of channels extending between the first and second ends, wherein the plurality of channels have a cell density within the range of from about 600 cells per square inch to about 1200 cells per square inch. The method may also include firing the first plurality of green honeycomb structural bodies in a firing atmosphere to a temperature of within a range of from about 800° C. to about 1000° C. for a period of time that is less than or equal to 5 hours, wherein an absolute value of ΔT between the outer surface and the central region of the green honeycomb structure is less than or equal to about 15° C. The method may also further comprise sintering the first plurality of green honeycomb structural bodies to produce a plurality of sintered honeycomb structural bodies having a fissure density of less than or equal to about 2%. The method may further include providing a second plurality of green honeycomb structural bodies each having a first end, a second end a plurality of channels extending between the first and second ends, wherein the plurality of channels has a cell density of within the range of from about 200 cells per square inch to about 600 cells per square inch, and firing the second plurality of green honeycomb structural bodies in the firing atmosphere to a temperature within the range of from about 800° C. to about 1000° C., wherein the firing of the second plurality of green honeycomb structural bodies is intermittent with the first plurality of green honeycomb structural bodies.

DETAILED DESCRIPTION

It is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
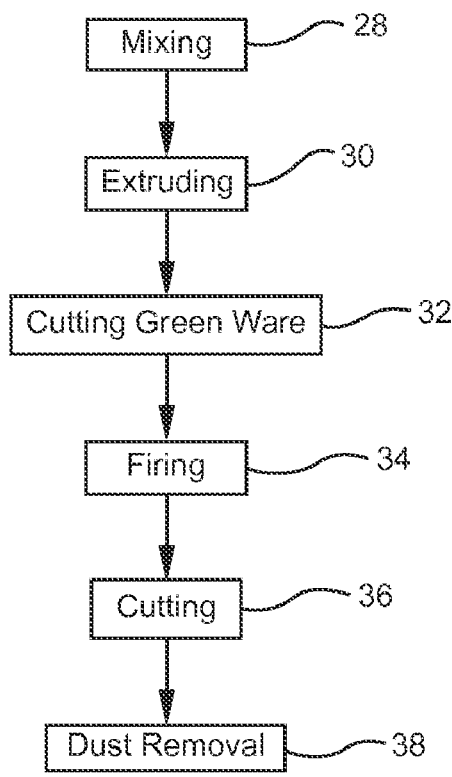
FIG. 1 is a flow-chart of a process employed to manufacture a honeycomb structural body.

Ceramic products of a honeycomb shape, or ceramic honeycomb structures, i.e., cellular ceramic bodies, may be prepared from a ceramic green body which may be formed through mixing of ceramic materials with water and various carbonaceous materials, including extrusion and forming aids to form a plasticized batch, forming the body into a honeycomb-shaped ceramic green body through extrusion of the plasticized batch, and finally firing the honeycomb-shaped ceramic green body in a firing furnace. The manufacture of a honeycomb structure may include the steps of batch mixing 28 (FIG. 1) an aqueous ceramic solution used to form the walls of the honeycomb structures, extruding 30 the aqueous ceramic solution through die sets thereby forming a green ware honeycomb structure, cutting 32 the green ware honeycomb structure into a particular length, firing 34 of the green ware honeycomb structure to form a hardened honeycomb structure, cutting 36 the hardened honeycomb structure to provide finished end faces, removing the dust 38 created during the cutting process 36.

One widely used method for forming honeycomb structures includes extrusion. Extrusion and forming aids may be in the forming of the honeycomb structures including, organic binders, plasticizers and lubricants, such as methylcelloluse, carboxymethlcellulose, polyvinyl alcohol, alkali stearates and the like. Furthermore, other carbonaceous materials such as graphite may be included in the batch as a pore-forming agent.

Carbonaceous material release or the decomposition of the carbonaceous material is an oxidation or exothermic reaction which releases large amounts of heat during the firing process. Initially the exothermic reaction may occur at the outer wall 15 or outer portion of the part, resulting in an initial thermal differential whereby the outer portion of the ceramic body is hotter than an interior portion, such as the core of a honeycomb structure; subsequently, the skin or outer portion exothermic reaction dies down, and the exothermic reaction region moves into the interior of the ware. Difficulties are encountered in effectively removing, either by conduction or convection, the heat from the ceramic body due to the fact that typical substrates are comprised of ceramic materials, for example cordierite, which are good insulators, and exhibit a cellular structure comprising numerous channels. Additionally, there is considerable surface area to promote binder reaction with the $O_2$ in the firing atmosphere due to the extensive cellular structure, thus exacerbating this interior exothermic effect. As such, during carbonaceous material release, the ceramic body exhibits either a positive or negative thermal differential, i.e., the core of the ceramic body exhibiting either a higher or lower temperature than that of the ceramic at or near the surface. This exothermic reaction, which occurs between 100° C. to 600° C. for carbonaceous materials such as an organic binder and the like, or in the range of 500° C. to 1000° C. temperature range if the body contains, for example, graphite, causes a significant temperature differential between the inside and outside of the part. This temperature differential in the part creates stresses in the ceramic body which may result in cracking of the part. This phenomenon is particularly true for large cellular ceramic parts or parts containing large amounts of organic materials.

Figure 2:
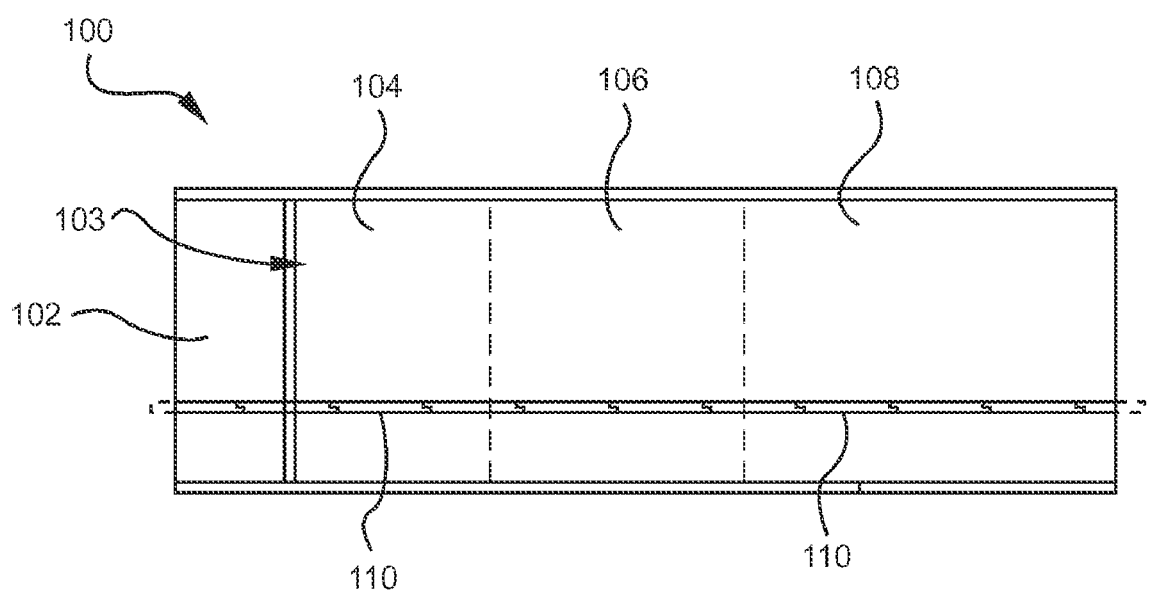
FIG. 2 is a schematic side view of a tunnel kiln which can be employed in the manufacturing process disclosed herein.

Disclosed herein is a method for firing ceramic honeycomb bodies in a kiln apparatus, which in some embodiments is a method that substantially reduces structural fissures associated with large temperature variances between outer and inner portions of the honeycomb bodies as they are fired within the kiln. FIG. 2 is a longitudinal schematic view illustrating an embodiment of a tunnel kiln that may be utilized. As illustrated, the tunnel kiln 100 may comprise a vestibule region 102, a firing tunnel 103 that comprises a plurality of firing atmosphere, including a clay-water release region 104 located downstream of the vestibule region 102, a talc-water release region 106 located downstream of the clay-water release region 104, and a sintering region 108 located down the stream of the talc-water release region 106. The firing of the kiln 100 of FIG. 2 is preferably divided into a plurality of firing zones which are heated by a plurality of heaters (not shown), such as a series of combustion burners capable of firing green ceramic honeycomb structural bodies. A plurality of ceramic honeycomb bodies are placed on a plurality of kiln cars for vehicles 110 adapted to convey the materials to be fired through the kiln 100 as described below.

In some embodiments, a clay-water release region 104 is maintained at a temperature range of 500° C. to 650° C. to encompass the clay-water release of a defined temperature range, e.g., 500° C. to 600°, while the talc-water release region 106 is typically maintained at a temperature range of 800° C. to 1000° C. to encompass the talc-water release of a defined temperature range, e.g., 800° C. to 950° C. The temperature range of the release regions 104, 106 may be increased or decreased depending the on the type of ceramic material to be fired in the tunnel kiln 100.

In some embodiments, green honeycomb structural bodies having differing thermal masses from one another are utilized. Specifically, as used herein, ultra thin wall honeycomb bodies will refer to those green honeycomb structural bodies having a wall thickness t of preferably less than or equal to 0.10 mm (4 mils), and more preferably less than or equal to 0.08 mm (3 mils), while thin wall honeycomb bodies will refer to green honeycomb structural bodies having a wall thickness t of preferably greater than or equal to 0.10 mm (4 mils), and more preferably of greater than or equal to 0.13 mm (5 mils). Further, the ultra thin wall honeycomb bodies preferably have a cell density preferably within the range of between 600 cells/in$^2$ to 1200 cells/in$^2$, and more preferably within the range of 600 cells/in$^2$ to 1000 cells/in$^2$, while the thin wall honeycomb structures have a cell density within the range of between 200 cells/in$^2$ and 600 cells/in$^2$. Ultra thin wall and thin wall vehicles 110, meaning those vehicles 110 loaded with ultra thin wall and thin wall honeycomb bodies, respectively, are mixed at different ratios and placed in different orders within the firing tunnel 103, for example depending on the product attributes, such as diameter, height, and or die weight, or other factors that relate to the green-state thermal density of the body, and pushed into the tunnel kiln 100. The present inventive approach varies significantly from previous common practices that include passing a long series of train cars or vehicles through the kiln 100 that carry products having similar characteristics such as similar thermal densities. The change of input to the firing process interacts with the equipment and process in such a way that the heating rate and temperature distribution are less varied for each of the product types processed. Further, the ultra thin wall and thin wall honeycomb bodies are preferably separated between vehicles 110, however, ultra thin wall and thin wall honeycomb bodies may also be mixed on the same vehicle 110. Moreover, the vehicles 110 carrying only ultra thin wall honeycomb bodies are mixed at a 0.4 ratio with the vehicles 110 carrying only thin wall honeycomb bodies, and are preferably separated from one another by at least vehicle 110 carrying a differing kind of honeycomb body. In some embodiments, it is preferable that the structural bodies, both ultra thin wall and thin wall, remain in the clay-water release region 104 for less than or equal to 4 hours, while maintaining $\Delta T$ between the outer portions and inner portions thereof of less than or equal to 10° C., and remain in the talc-water release region 106 for less than 5 hours while maintaining a $\Delta T$ between the outer portions and inner portions thereof that is less than or equal to 15° C. and more preferably less than or equal to 10° C. in order to ensure a fissure density within the end product subsequent to sintering of preferably less than or equal to 5%, more preferably less than or equal to 2%, and most preferably less than or equal to 1%.

The present inventive method of mixing of product having different thermal densities, e.g., ultra thin wall and thin wall products, helps to reduce the fissure density without requiring any alteration of kiln settings or standard loading procedure including the load pattern, use of a particular setter and stack height, and the like. Major advantages can include a reduction in fissures within each of the produced parts, consistency in color of the produced parts, reduced face cracking of the produced parts with no lengthening of the firing cycle, and/or no change in the firing schedule. For example, by adjusting the ratio of mixing between parts having relatively high and low thermal density, or by mixing thin wall and ultra thin wall products within the kiln, the crack level or fissure density of the fired products is greatly reduced. The reduction in fissure density can vary depending on the difference in car mass, loading density, stack weight, composition, organic mass and product geometry of the vehicles, for example as loaded with thin wall and ultra thin wall products. Thus, first and second types of honeycomb bodies may have different wall thicknesses, composition, organic mass, overall product geometry (length, width/diameter, shape, etc.), weight, density, thermal mass, or other characteristic or characteristics.

In one aspect, a method is disclosed herein of manufacturing honeycomb bodies comprising: placing first and second subsets of honeycomb bodies in a tunnel kiln while conveying the first and second subsets of honeycomb bodies through the tunnel kiln, wherein the honeycomb bodies are exposed to a plurality of heating zones in the kiln, wherein each honeycomb body in the first subset has a honeycomb wall thickness of greater than or equal to 0.10 mm (4 mils), and wherein each honeycomb body in the second subset has a honeycomb wall thickness of less than or equal to 0.08 mm (3 mils), wherein the honeycomb bodies are conveyed on vehicles arranged in sequential order inside the kiln, and at least one vehicle carrying a honeycomb body of the second subset is interposed between at least two vehicles carrying only honeycomb bodies of the first subset, wherein fewer than 60% of the honeycomb bodies present in the kiln are from the second subset.

In another aspect, a method is disclosed herein of manufacturing honeycomb bodies comprising: placing first and second subsets of honeycomb bodies in a tunnel kiln while conveying through the tunnel kiln, the first and second subsets of honeycomb bodies arranged on a plurality of vehicles comprising a first group of vehicles carrying honeycomb bodies of the first subset and a second group of vehicles carrying honeycomb bodies of the second subset, wherein the honeycomb bodies are exposed to a plurality of heating zones in the kiln, wherein each honeycomb body in the first subset has a honeycomb wall thickness of greater than the honeycomb wall thickness of each honeycomb body in the second subset, wherein fewer than 60% of the honeycomb bodies in the kiln are of the second type. In some embodiments, fewer than 45% of the vehicles in sequence in the kiln carry at least one honeycomb body of the second type. In some embodiments, fewer than 30% of the vehicles in sequence in the kiln carry at least one honeycomb body of the second type. In some embodiments, fewer than 15% of the vehicles in sequence in the kiln carry at least one honeycomb body of the second type. In some embodiments, the plurality of vehicles comprises more than seven vehicles, and for every seven of the vehicles arranged in sequence, no more than two vehicles carrying a honeycomb body of the second type are arranged adjacent to each other. In some embodiments, the plurality of vehicles comprises more than seven vehicles, and for every seven of the vehicles arranged in sequence, no more than one vehicle carrying at least one honeycomb body of the second type are arranged adjacent to each other. In some embodiments, the plurality of vehicles comprises more than seven vehicles, and no more than seven of the plurality of vehicles arranged in sequence carry at least one honeycomb body of the second type. In some embodiments, at least one of the plurality of vehicles carries more than one honeycomb body. In some embodiments, each of the plurality of vehicles carries more than one honeycomb body. In some embodiments, the plurality of vehicles comprises more than thirty vehicles. In some embodiments, the tunnel kiln comprises more than thirty heating zones. In some embodiments, the number of vehicles is substantially equal to the number of heating zones. In some embodiments, the number of vehicles is greater than the number of heating zones. In some embodiments, the number of vehicles is less than the number of heating zones. In some embodiments, water is removed from each honeycomb body as the body is conveyed through the kiln. In some embodiments, an absolute value of a temperature difference between an outer surface and a central region of each honeycomb body does not exceed about 15° C.

In another aspect, a method is disclosed herein for fabricating ceramic honeycomb structural bodies, the method comprising: providing a kiln defining a firing tunnel; providing at least one vehicle adapted to support green honeycomb structural bodies; providing at least one green honeycomb structural body of a first type comprising a plurality of cells defined by a plurality of intersecting walls having a wall thickness of 0.10 mm (4 mil) or more; providing at least one green honeycomb structural body of a second type comprising a plurality of cells defined by a plurality of intersecting walls having a wall thickness of less than 0.10 mm (4 mil); placing the at least one green honeycomb structural body of the first type and the at least one green honeycomb structural body of the second type on the at least one vehicle; transporting the at least one vehicle into the firing tunnel, wherein both the at least one green honeycomb structural body of the first type and the at least one green honeycomb structural body of the second type are disposed in the firing tunnel at the same time; and firing the at least one green honeycomb structural body of the first type into an at least one ceramic honeycomb structural body and firing the at least one green honeycomb structural body of the second type into an at least one ceramic honeycomb structural body of the second type. In some embodiments, each of the first plurality of ceramic honeycomb structural bodies has a wall thickness of 0.13 mm (5 mil) or more. In some embodiments, the second ceramic honeycomb structural body has a wall thickness of 0.10 mm (4 mil) or less. In some embodiments, the at least one green honeycomb structural body of the first type is a plurality of green honeycomb structural bodies of the first type. In some embodiments, the at least one green honeycomb structural body of the second type is a plurality of green honeycomb structural bodies of the second type. In some embodiments, the at least one green honeycomb structural body of the second type is disposed on a vehicle of the at least one vehicle which is not carrying any green honeycomb structural bodies of the first type. In some embodiments, the at least one green honeycomb structural body of the first type includes a plurality of green honeycomb structural bodies of the first type that are disposed on a single vehicle of the at least one vehicle. In some embodiments, the at least one green honeycomb structural body of the first type includes a plurality of green honeycomb structural bodies of the first type, and wherein each of a first subset of the at least one vehicle is loaded with the plurality of green honeycomb structural bodies of the first type; in some of these embodiments, the at least one green honeycomb structural body of the second type includes a plurality of green honeycomb structural bodies of the second type, and wherein each of a second subset of the at least one vehicle is loaded with the plurality of green honeycomb structural bodies of the second type. In some embodiments, the at least one green honeycomb structural body of the second type includes a plurality of green honeycomb structural bodies of the second type that are disposed on a single vehicle. In some embodiments, the at least one vehicle includes a plurality of vehicles, the at least one green honeycomb structural member of the first type includes a plurality of green honeycomb structural bodies of the first type that are disposed on a single first vehicle of the plurality of vehicles, and each of a first subset of the plurality of vehicles is loaded with the plurality of green honeycomb structural bodies of the first type, and wherein the at least one green honeycomb structural body of the second type includes a plurality of green honeycomb structural bodies of the second type that are disposed on a single vehicle of the plurality of vehicles, and each of a second subset of the plurality of vehicles is loaded with the plurality of green honeycomb structural bodies of the second type, wherein a ratio of the vehicles in the first subset to the total vehicles in the first and second subsets is greater than 0.4; in some of these embodiments, each vehicle in the second subset is separated from another vehicle in the second subset by at least one vehicle in the first subset. In some embodiments, the at least one green honeycomb structural body of the first type has a cell density of 600 to 1200 cells per square inch. In some embodiments, the at least one green honeycomb structural body of the second type has a cell density of 200 to 600 cells per square inch.

In another aspect, a method is disclosed herein for fabricating a ceramic honeycomb structural body comprising the steps of: providing a plurality of first green honeycomb structural bodies each having an outer surface, a central region, a first end, a second end and plurality of first channels extending between the first and second ends, the plurality of first channels defined by a plurality of intersecting first walls and having a cell density of within the range of from about 600 cells per square inch to about 1200 cells per square inch; firing the plurality of first green honeycomb structural bodies in a firing atmosphere to a temperature of within a range of from about 800° C. to about 1000° C. for a period of time that is less than or equal to about 5 hr, wherein an absolute value of $\Delta T$ between the outer surface and the central region of the green honeycomb structure is less than or equal to about 15° C.; and sintering the plurality of first green honeycomb structural bodies to produce a plurality of first sintered honeycomb structural bodies having a fissure density of less than or equal to about 2%. In some embodiments, the method further includes the steps of: providing a plurality of second green honeycomb structural bodies each having a first end, a second end and plurality of second channels extending between the first and second ends, the plurality of second channels defined by a plurality of intersecting second walls and having a cell density of within the range of from about 200 cells per square inch to about 600 cells per square inch; and firing the plurality of second green honeycomb structural bodies in the firing atmosphere to a temperature of within a range of from about 800° C. to about 1000° C., wherein the firing of the plurality of the second green honeycomb structural bodies is intermittent with the plurality of first green honeycomb structural bodies. In some embodiments, the at least a subset of the first walls of the plurality of first green honeycomb structural bodies each have a thickness of less than 0.10 mm (4 mils); in some of these embodiments, at least a subset of the second walls of the plurality of second green honeycomb structural bodies each have a thickness of greater than or equal to 0.10 mm (4 mils). In some embodiments, a ratio of the first green honeycomb structural bodies to the second green honeycomb structural bodies within the firing atmosphere is less than or equal to 0.4. In some embodiments, the method further includes the step of firing the first plurality green honeycomb structural body in the firing atmosphere to a temperature of within a range of from about 450° C. to about 600° C. for a period of time of less than or equal to about 4 hr, wherein an absolute value of $\Delta T$ between the outer surface and the central region of each first green honeycomb structure is less than or equal to about 10° C. and wherein the step of firing within the temperature range of from about 450° C. to about 600° C. is completed prior to the step of firing to a temperature of within the range of from about 800° C. to about 1000° C. In some embodiments, the cell density of the first plurality of green honeycomb structural bodies is within the range of from 600 cells per square inch to 1000 cells per square inch. In some embodiments, the absolute value of $\Delta T$ between the outer surface and the central region of each first green honeycomb structure is less than or equal to 10° C. In some embodiments, the fissure density of the first sintered honeycomb structural bodies is less than or equal to 1%.

We have observed that fissure rates increase as die wear increases, which leads to thicker web/wall thicknesses. For such extruded articles made with dies that have considerable wear, we have achieved a 50% reduction in fissure rate in ultra think wall articles by placing both thin wall and ultra thin wall honeycomb articles together in a tunnel kiln, wherein less than 60% of the articles are ultra thin wall, and an 85% reduction in fissure rate in ultra think wall articles with less than 30% of the articles being ultra thin wall, i.e. the mixing of different types of ware within the kiln helped to absorb differences in wall thickness due to other variables (such as die wear) in order to achieve lower fissure (rejection) rates.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

What is claimed is:

1. A method of manufacturing honeycomb bodies comprising:
conveying first and second subsets of honeycomb bodies through a tunnel kiln, the first subset comprising at least one honeycomb body of a first type and the second subset comprising at least one honeycomb body of a second type, the at least one honeycomb body of the first type and the at least one honeycomb body of the second type being disposed in the tunnel kiln at the same time, the first and second subsets of honeycomb bodies arranged on a plurality of vehicles comprising a first group of vehicles carrying honeycomb bodies of the first subset and a second group of vehicles carrying honeycomb bodies of the second subset, wherein the honeycomb bodies are exposed to a plurality of heating zones in the kiln, each honeycomb body of the first type in the first subset having a honeycomb wall thickness of greater than the honeycomb wall thickness of each honeycomb body of the second type in the second subset, and fewer than 60% of the honeycomb bodies present in the kiln at the same time being of the second type.

2. The method of claim 1 wherein fewer than 45% of the vehicles in sequence in the kiln carry at least one honeycomb body of the second type.

3. The method of claim 1 wherein fewer than 30% of the vehicles in sequence in the kiln carry at least one honeycomb body of the second type.

4. The method of claim 1 wherein fewer than 15% of the vehicles in sequence in the kiln carry at least one honeycomb body of the second type.

5. The method of claim 1 wherein the plurality of vehicles comprises more than seven vehicles, and for every seven of the vehicles arranged in sequence, no more than two vehicles carrying a honeycomb body of the second type are arranged adjacent to each other.

6. The method of claim 1 wherein the plurality of vehicles comprises more than seven vehicles, and for every seven of the vehicles arranged in sequence, no more than one vehicle carrying at least one honeycomb body of the second type are arranged adjacent to each other.

7. The method of claim 1 wherein the plurality of vehicles comprises more than seven vehicles, and wherein no more than seven of the plurality of vehicles arranged in sequence carry at least one honeycomb body of the second type.

8. The method of claim 1 wherein at least one of the plurality of vehicles carries more than one honeycomb body.

9. The method of claim 1 wherein each of the plurality of vehicles carries more than one honeycomb body.

10. The method of claim 1 wherein the plurality of vehicles comprises more than 30 vehicles.

11. The method of claim 1 wherein the tunnel kiln comprises more than 30 heating zones.

12. The method of claim 1 wherein the number of vehicles is substantially equal to the number of heating zones.

13. The method of claim 1 wherein the number of vehicles is greater than the number of heating zones.

14. The method of claim 1 wherein the number of vehicles is less than the number of heating zones.

15. The method of claim 1 wherein water is removed from each honeycomb body as the body is conveyed through the kiln.

16. The method of claim 1 wherein an absolute value of a temperature difference between an outer surface and a central region of each honeycomb body does not exceed about 15° C.

17. The method of claim 1, further comprising sintering the first and second subsets of honeycomb bodies such that, after sintering, the honeycomb bodies of the first subset and the honeycomb bodies of the second subset have a fissure density of less than 5.0%.

18. The method of claim 17 wherein:
the plurality of heating zones comprises a clay-water release region, a talc-water release region located downstream of the clay-water release region, and a sintering region located downstream of the talc-water release region;
the first and second subsets of honeycomb bodies are positioned in the clay-water release region for $\leq 4$ hours while maintaining a temperature difference $\Delta T$ between outer portions of the honeycomb bodies and inner portion of the honeycomb bodies of $\leq 10°$ C.; and
the first and second subsets of honeycomb bodies are positioned in the talc-water release region for $\leq 5$ hours while maintaining a temperature difference $\Delta T$ between outer portions of the honeycomb bodies and inner portion of the honeycomb bodies of $\leq 15°$ C.

19. A method of manufacturing honeycomb bodies comprising:
conveying first and second subsets of honeycomb bodies through a tunnel kiln, the first subset comprising at least one honeycomb body of a first type and the second subset comprising at least one honeycomb body of a second type, the at least one honeycomb body of the first type and the at least one honeycomb body of the second type being disposed in the tunnel kiln at the same time, wherein the honeycomb bodies are exposed to a plurality of heating zones in the kiln, each honeycomb body of the first type in the first subset having a honeycomb wall thickness of greater than or equal to 0.10 mm, and each honeycomb body of the second type in the second subset having a honeycomb wall thickness of less than or equal to 0.08 mm, the honeycomb bodies being conveyed on vehicles arranged in sequential order inside the kiln, and at least one vehicle carrying a honeycomb body of the second subset is interposed between at least two vehicles carrying only honeycomb bodies of the first subset, and fewer than 60% of the honeycomb bodies present in the kiln are from the second subset.

20. A method of manufacturing honeycomb bodies comprising:
conveying first and second subsets of honeycomb bodies through a tunnel kiln such that the first and second subsets of honeycomb bodies are disposed in the tunnel kiln at the same time, the first subset comprising at least one honeycomb body of a first type and the second subset comprising at least one honeycomb body of a second type, the at least one honeycomb body of the first type and the at least one honeycomb body of the second type being disposed in the tunnel kiln at the same time, wherein the honeycomb bodies are exposed to a plurality of heating zones in the kiln, each honeycomb body of the first type in the first subset having a honeycomb wall thickness of greater than or equal to 0.10 mm, and each honeycomb body of the second type in the second subset having a honeycomb wall thickness of less than 0.10 mm, the honeycomb bodies being conveyed on vehicles arranged in sequential order inside the kiln, and at least one vehicle carrying a honeycomb body of the second subset is interposed between at least two vehicles carrying only honeycomb bodies of the first subset, and fewer than 60% of the honeycomb bodies present in the kiln are from the second subset; and sintering the first and second subsets of honeycomb bodies such that, after sintering, the honeycomb bodies of the first subset and the honeycomb bodies of the second subset have a fissure density of less than 5.0%.

* * * * *